United States Patent [19]

Oyama

[11] 3,945,148

[45] Mar. 23, 1976

[54] METHOD AND APPARATUS FOR GROWING BEAN SPROUTS

[76] Inventor: George Clem Oyama, 9, Shiba, Nishikubo, Shiroyama-cho, Minato, Tokyo, Japan

[22] Filed: Mar. 10, 1975

[21] Appl. No.: 556,629

[52] U.S. Cl. ................................................ 47/14
[51] Int. Cl.² ........................................ A01G 9/02
[58] Field of Search .................. 47/14, 16, 1.2, 38

[56] References Cited
UNITED STATES PATENTS

| | | | |
|---|---|---|---|
| 2,522,798 | 9/1950 | Persha et al. | 47/14 |
| 2,677,217 | 5/1954 | Pentler et al. | 47/14 |
| 2,750,713 | 6/1956 | Chin | 47/14 |
| 2,810,988 | 10/1957 | Chin | 47/14 |
| 3,616,560 | 11/1971 | Mun | 47/1.2 |

*Primary Examiner*—Robert E. Bagwill
*Attorney, Agent, or Firm*—James R. Cypher

[57] ABSTRACT

A method of growing high quality bean sprouts on a mass production basis which consists briefly of placing a relatively large quantity of mung beans in a container, leveling and covering the quantity of beans with a substantially opaque receptacle cover for temporarily holding a quantity of water, the cover being formed with openings for the immediate distributed passage of water therethrough, initially covering the quantity of germinated beans with warm water and immediately draining the water from the container and thereafter periodically wetting said sprouts, draining off all water in the container, injecting warm air at a low pressure in a reverse direction to the drainage flow, and repeating the watering, drainage, and presurizing steps at intervals until the bean sprouts have matured.

The apparatus consists briefly of a container having vertical side walls, bottom walls sloping at a slight angle to a central drain and a screen covering the drain area. A substantially opaque receptacle cover with perforations to permit the even distribution of water to the container is slideably mounted within the container to rise as the sprouts develop and fill the container. A pressure pump and an optional vacuum pump are connected to the container through the water drain.

15 Claims, 5 Drawing Figures

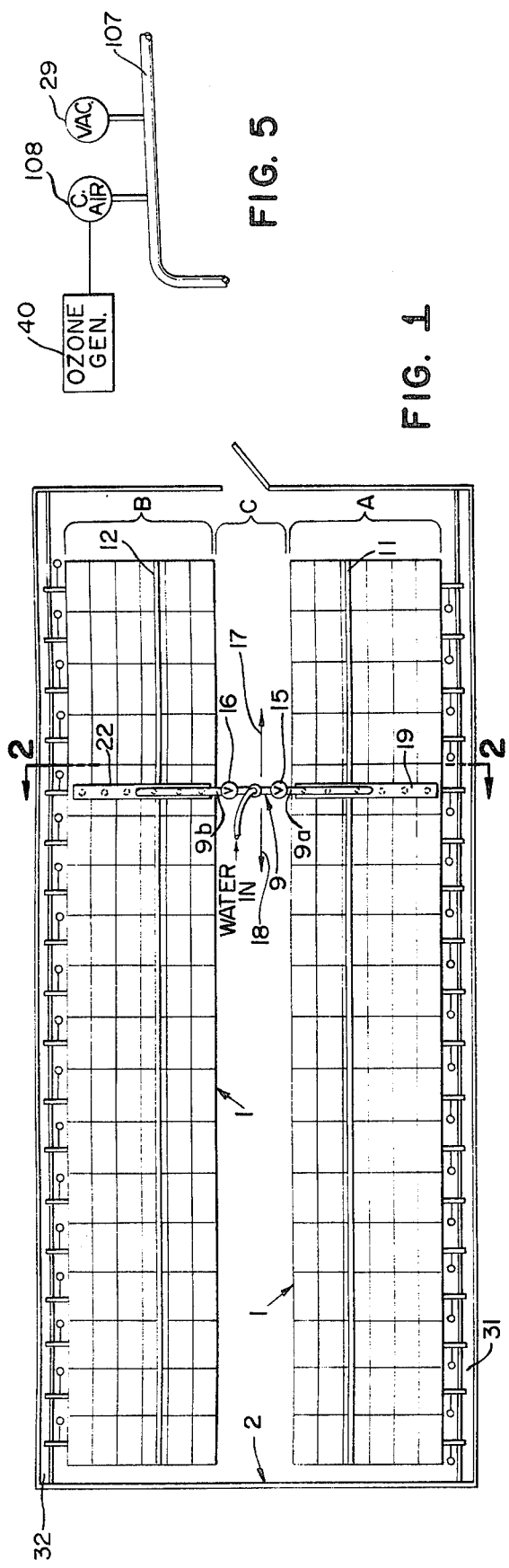
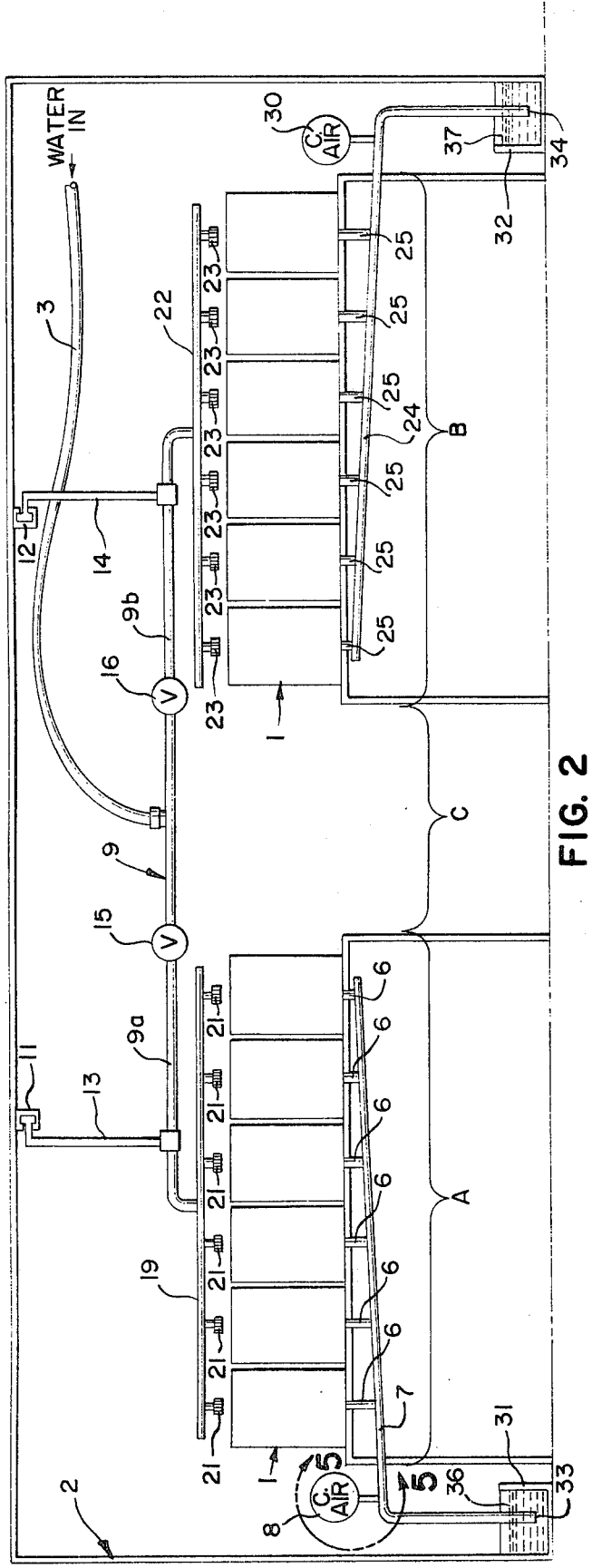

METHOD AND APPARATUS FOR GROWING BEAN SPROUTS

BACKGROUND OF THE INVENTION

Bean sprouts have been grown and harvested for over 6,000 years. Production has been on a limited scale due to the labor intensive method used. Recently, high production methods have been tried using some of the techniques of hydroponic cultivation. These techniques include the placing of beans in a container, covering the beans with water, and then draining. This method has resulted in poor yeilds since the lowermost beans tend to "drown" and rot. Efforts to prevent "drowning" by periodically stirring the bean sprouts while they are growing have only been partially successful. Stirring the beans causes poor growth because of the tendency of the sprouts to grow downwardly. When they are stirred, some of the beans are pointed upwardly, and the plants must expend much energy in trying to "turn around" resulting in a low yield (i.e., ratio of weight of finished sprouts to beans) and sprouts which are crooked and unhealthy looking.

Lastly, because bacteria grows very rapidly in the dark, moist, and warm conditions in which bean sprouts are grown, spoilage of a few of the "drowned" sprouts frequently results in spoilage of a substantial portion of the sprouts by the time they are ready for harvesting.

SUMMARY OF THE INVENTION

The gist of the present invention is the use of apparatus for mass producing bean sprouts by periodically wetting the germinated beans and then aeration by subjecting them to low pressure air.

The objectives which have been achieved by using the apparatus and methods of the present invention are as follows:

1. A healthier, crisper and better looking sprout has been produced. Sprouts grown using the method described are straighter because their growth position is undisturbed throughout the entire period of growth.

2. A higher yield of sprout-to-bean by weight is achieved. Sprouts grown by present methods yield about a 7 to 1 sprout-to-bean weight ratio while sprouts grown under the method of the invention achieve an 8 or 9 to 1 sprout-to-bean weight ration.

3. The method produces a bean sprout which will keep longer after havesting. Presently, bean sprouts will keep 1 to 3 days. Sprouts grown using the present method will keep 10 days under refrigeration.

4. The method produces a bean sprout which shrinks less during the normal 30 to 40 seconds cooking time.

5. The optimum harvest time may be predicted more accurately and even controlled within a 3½ to 7 day time period.

6. The method inhibits the growth of root hairs on the sprout by requently changing the water and forcing air up through the bean sprouts in the container. Hair roots are the result of the sprout's search for water after becoming overly dry between waterings—a common problem with other growing methods. Yet, overwatering results in "drowning" and spoilage. The method has the advantage of minimizing hair root growth by achieving a proper balance between watering and aeratiton of the sprouts. Moreover, the constant cycling of water and air jostles the sprouts sufficiently so that the few hair roots that do form are disengaged from adjacent sprouts. Consequently, the roots are prevented from taking a substantial amount of moisture from the adjacent sprouts which would trigger hair root growth in the adjacent sprouts.

7. Human labor is minimized and working conditions are improved with the apparatus.

8. Utilizing the apparatus and methods of the present invention, a higher yield per growing area is achieved.

9. There is greater production of live sprouts, and "drowned" sprouts and spoilage have been minimized.

BRIEF DESCRIPTION OF THE DRAWINGS

FIG. 1 is a schematic plan view of the system used in the present invention.

FIG. 2 is an enlarged cross-sectional view of the system as taken along line 2—2 of FIG. 1.

FIG. 5 is a schematic sketch of a portion of an alternate form of the invention which corresponds to the portion of the invention shown in the vicinity of lines 5—5 of FIG. 2.

BRIEF DESCRIPTION OF THE PREFERRED EMBODIMENTS OF THE INVENTION

Figure 3:
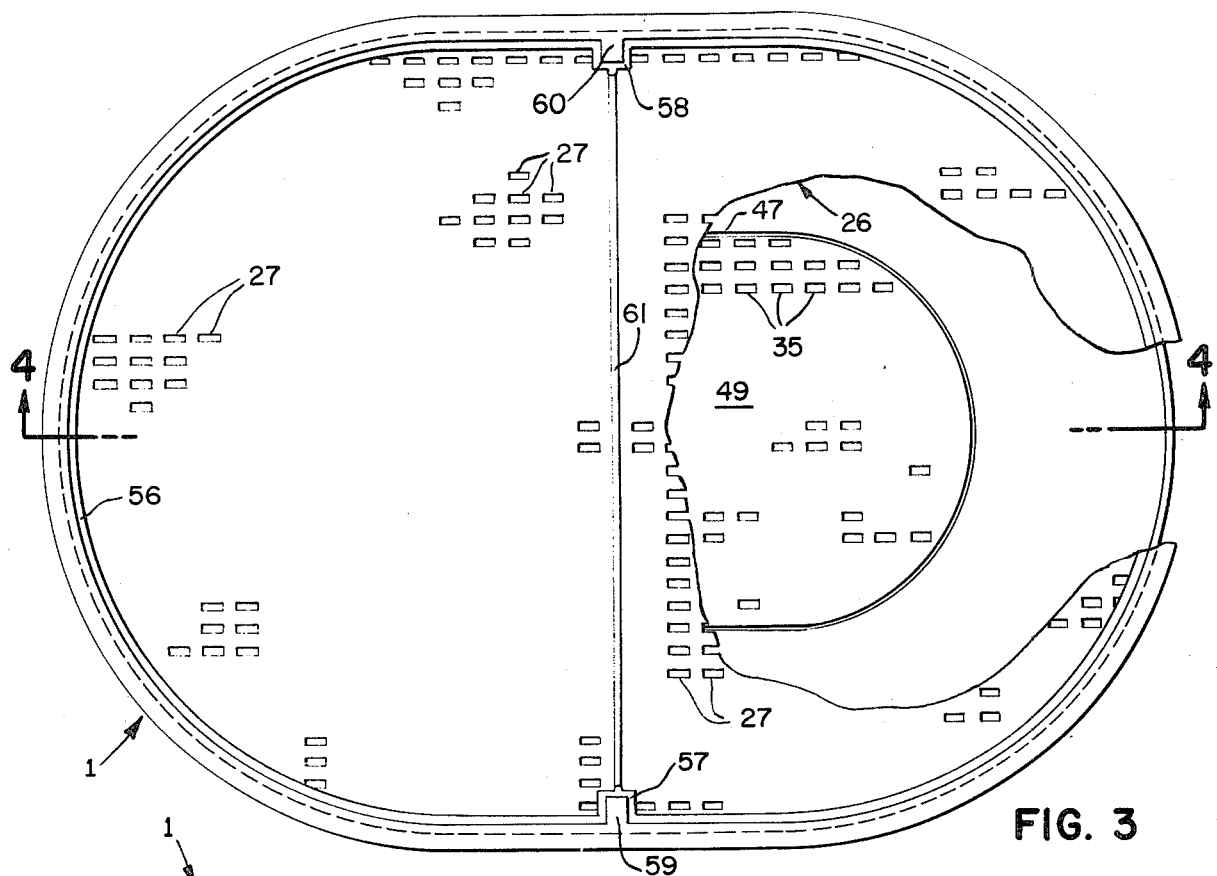
FIG. 3 is an enlarged top view of one of the containers shown in FIG. 2 with a portion of the tray broken away.

The apparatus necessary to grow bean sprouts using the process of the present invention consists briefly of a container 1 placed in a room 2. A water conduit 3 discharges a metered volume of water into the container at selected intervals. The container is formed with a drain opening 4 and a length of conduit 6 releasably connects the drain opening in the container to a length of drain conduit 7. An air pressure means 8 is connected to the drain 7 and is selected to force air upwardly through drain 7, conduit 6 and container 1.

Preferably, the apparatus consists of a plurality of containers for producing the bean sprouts in commercial volume. As shown in FIG. 2, the containers are arranged in side by side relationship in a row A. A second set of containers B may be arranged in alignment with row A separated by an aisle C.

As shown in FIG. 1, room 2 may contain several rows of containers and receive water from a single traveling manifold pipe 9 suspended from rails 11 and 12 on hangers 13 and 14. Valves 15 and 16 are preferably electrically controlled so that side 9a will be open and discharge water to side 9a of the manifold in one direction of travel of the manifold 9 such as the direction shown by arrow 17, and to water side 9b of the manifold in the other direction as shown by arrow 18.

In order to discharge water to all of the containers in a single row such as row A, a branch manifold pipe 19 is connected to the end of the side 9a of the manifold and a plurality of discharge nozzles 21 are mounted above the containers. In like manner, a second branch manifold 22 is connected to side 9b of the manifold and discharge nozzles 23 are located along the conduit above the containers in row B.

As shown in FIG. 2, a single drain pipe 7 may be connected to all of the containers in a single row at their respective drain conduits 6. In like manner containers 1 in row B may be connected to a single drain conduit 24 which is connected to the containers respectively at drain pipe connections 25.

Each container is fitted with a rigid cover 26 which is dimensioned to slide vertically within the container. The covers are formed with a plurality of openings 27 to permit the flow of water therethrough.

The openings are about 2 mm in diameter or they may be slits about 2 mm wide. The holes 27 are evenly distributed over the entire bottom area of the cover and reduce the amount of light entering the growing area, as well as serving to evenly distribute the water which is received from nozzles. In one form of the invention, the slits 27 are about 2 mm × 9.5 mm and are evenly distributed; there being about 0.96 slots per square centimeter or 6.17 slots per square inch. The sidewalls of the cover are about 50 mm deep so that water may be delivered quickly to the cover and then drain more slowly from the cover into the growing area.

FIG. 5 shows an alternate form of the invention. The alternate form of the invention is in all respects identical to the form of the invention shown in FIGS. 1 – 4 with the exception that a vacuum pump 29 is added to drain line 107 which corresponds to line 7 of FIG. 2. The pressure pump means 108 which corresponds to pump 8 of FIG. 2 is shown to indicate the location of the vacuum pump.

In order to drain the excess water, troughs 31 and 32 are provided beneath the discharge ends 33 and 34 of pipes 7 and 24 respectively.

The openings in the cover may be the same size as the openings 35 in the drain grate described below. The cover is formed with non-permeable side walls 56 which fit in close sliding fit with the sidewalls of the container with a clearance of about 4 mm and serves to hold the water in the cover until it is distributed evenly over the entire surface of the tray and drains through the openings. The sides of the cover are formed with indentations 57 and 58 which slide in rails 59 and 60 formed on the sidewalls of the container. In order to prevent sticking of the cover against the sides of the container, the indented areas 57 and 58 and a mid-elongated area 61 are preferably formed of a compressible material or the material may be thinned so that it will buckle slightly.

The method of growing bean sprouts consists briefly of placing a quantity of previously germinated mung beans in the container 1. Depending upon the kind of bean, the container is filled to a depth of about 2 to 4 centimeters.

The beans are leveled and then the cover 26 is placed on top of the beans. The cover need not be of any special material. The purpose of the cover, which is perforated with a plurality of holes 27, is to evenly distribute the water which is directed into the container from nozzles 21 and 23 and minimize the amount of light reaching the sprouting beans and prevent the beans from floating when the container is filled with water. Further, the lid keeps a light pressure on the beans; promoting a uniform rate of growth. Suitable covers may be made from 2 to 3 millimeter thick plastic.

Figure 4:
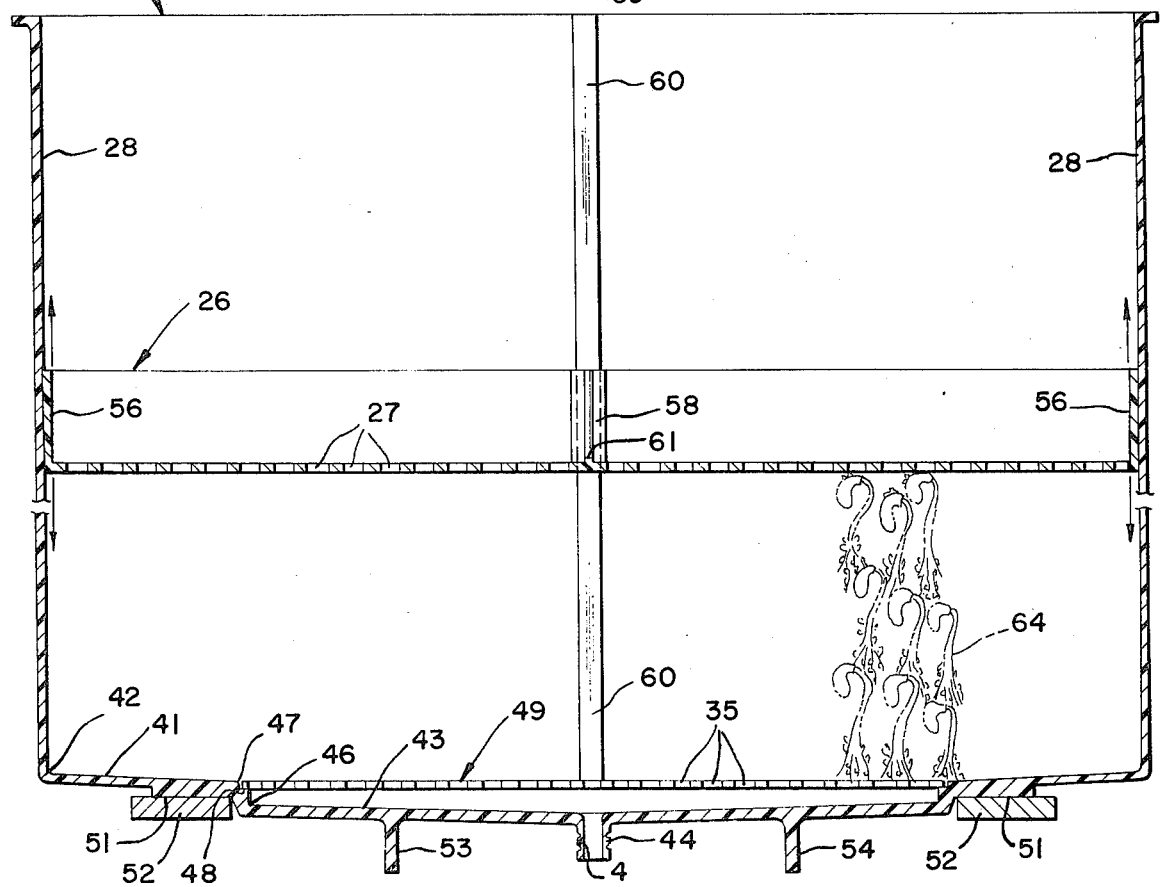
FIG. 4 is a cross-sectional view of one of the containers used in the present system taken along line 4—4 of FIG. 3.

The container is formed with vertical walls 28 so that the cover will always remain in relatively tight sliding seal with the walls as the cover is forced to rise by the growing bean sprouts. The weight of the cover helps maintain a level growth. The drain opening is placed in the container so that all of the water will drain from the container and none of the beans will "drown." FIG. 4 illustrates the manner in which bean sprouts 64 raise the cover 26.

After the cover is in place, a sufficient amount of water is metered into the container so that the beans are just covered. The temperature of the water should be between 25° C. and 30° C. or the water temperature may be 22° – 25° C. if air temperature is maintained at higher ranges. The room temperature should be maintained at approximately the same temperature as the water temperature and may be lowered each day as growth progresses. The container should be filled rapidly to a level just covering the beans in 5 – 30 seconds and then permitted to immediately drain. At first, drainage should occur in about 1½ to 2 minutes. As the bean sprouts grow it will, of course, take longer to completely cover the sprouts and may take as much as 10 to 15 minutes to drain the container. There is no valve in the bottom of the container and the container is actually draining as it is being filled. The inside diameter of the drain opening is about 9 millimeters to 1 centimeter inside diameter.

Shortly after the container is completely drained, in the alternate form of the invention, a vacuum pump 29 may be turned on for about 5 to 10 seconds. The vacuum, if used, should be from 40 to 80 centimeters water pressure but is normally about 80 centimeters water pressure to draw off the excess water on the bottom of the contianer. A short burst of vacuum will break the water film which forms over the openings in the grate. Special controls may be used, but one simple and inexpensive way to accomplish the vacuum is to place the outlet headers 7 and 24 from 40 to 80 centimeters above the level of the water discharge openings 33 and 34 of the trough 31 and 32. The discharge opening is placed below water level 36 and discharge opening 34 is placed below water level 37. The purpose of the vacuum is to insure that all of the water is drawn out of the container and excess water is removed from the sprouts.

It should be noted that the process will produce bean sprouts without the application of vacuum if the sprouts are well drained immediately after each application of water.

The next step in the process is to immediately follow the vacuum or drainage with the application of air pressure. Pressure means 8, which may be a fan, is turned on and forces air at room temperature of from 20° – 30° C. along conduit 7, up conduit 6 and through discharge openings 4 into the containers 1. Back pressured air at about 15° C. may be used to slow growth. The pressure is used to aerate the sprouts and should be very light; just sufficient to push up through the beans and sprouts. The pressure should continue long enough to change the air in the container. Preferably a back pressure of under 1 centimeter water pressure should be used and this pressure should then be maintained at all times. However, it is possible to use back pressure of 5 to 10 centimeters water pressure for short periods of time; such as 1 to 5 minutes after each addition of water. Pressure means 30 is similar to pressure means 8 and is connected to discharge line 24.

The complete cycle of adding water, draining, vacuum and pressure should be repeated at regular intervals four to ten times per 24-hour day. Complete control over the rate and type of growth can be achieved by varying water and room temperature and the number of watering cycles. Lowering room and water temperature will slow the growth. Very slow growth will occur at a lowered temperature of 15° C.

After about the second day of growth, the sprouts give off heat as they grow. The water and circulating air both serve to dissipate this heat and prevent harm to the sprouts from "hot spots" which might develop within the container.

In order to minimize spoilage due to airborne bacteria, a low concentration of ozone may be forced through the bean sprouts during each pressure cycle. The ozone generator 40 may be placed in the room near or in the vicinity of the intake of the pressure fan. An ozone generator of the type manufactured by Banbac and used in the meat departments of supermarkets is suitable.

It should be noted that no nutrients or other chemicals are added to the water. The water is good quality fresh water.

Each container used in the present method contains several hundred thousand bean sprouts.

Bean sprouts grown by present methods yield a 7 to 1 sprout-to-bean weight ratio, while sprouts grown under the method of the invention achieve an 8 or 9 to 1 sprout-to-bean weight ratio.

The bean sprouts grown using the method described are straighter because the process does not turn the beans upside down but rather permits them to continue to grow straight down during the entire period of growth.

Due to the number of changes of water and the frequent forcing of warm air up through the bean sprouts in the container, hair root growth is inhibited. It is only when the sprouts become dry that the sprouts send out hair roots in search of water. The constant cycling of water and air jostles the sprouts sufficiently so that the hair roots that do grow are disengaged from adjacent sprouts. Thus the hair roots are not permitted to take the moisture from adjacent sprouts which in turn trigger hair root growth in the sprout being touched.

The container used in the process should be constructed with inside walls having a hydrophobic surface. The container may be made of plastic. The side walls are approximately 60 centimeters in height. The bottom wall 41 has a slope of about 20 to 1 so that the water will drain from the perimeter 42 to a depressed sloping area 43 in the center of the bottom wall. The center depressed area 43 slopes toward a drain opening 4 and water is removed through short conduit 44 which depends from the bottom of the container.

Containers of various sizes and shapes may be used, but as an example, the container may have a shape as shown in the drawings which has straight sides and curved ends. The long dimension may be approximately 590 millimeters and the width may be about 400 millimeters.

The sloping perimeter area 41 has a width of about 100 millimeters. The length of the depressed portion 43 is about 360 millimeters and has a width of about 190 millimeters. Depth of the depressed area at its outer edge 46 below the lowermost edge of the perimeter area is 9 millimeters and the depth of the depressed area at the drain opening is about 14 millimeters below the lowermost edge 47 of the perimeter area. A shoulder area 48 at the junction of the perimeter area and the depressed area of about 3 millimeters depth and 4 millimeters width is provided on the inside edge of the perimeter area of the bottom wall for receipt of a strainer or drain grill 49. The grill covers the depressed area and is provided with openings which are preferably rectangular in shape and have a length of about 9.5 millimeters and a width of about 1.6 millimeters. The rectangular openings are disposed in rows and columns about 4.75 millimeters apart. The grating has a thickness of about 3 millimeters and is formed with depending legs to prevent the weight of the sprouts from crushing it down against the bottom wall.

Since the bottom walls of the container slope, a flat surface 51 may be formed therein so that the container may rest evenly on a support member 52. Legs 53 and 54 depend from the bottom of the container below the bottom of conduit 44 to protect the conduit and to support the weight of the container when it is not resting on support 52.

In practice, a plurality of containers 1 are used with several spray heads feeding water to the various containers. The troughs 31 and 32 are elongated members which run between the rows of containers.

In harvesting the bean sprouts, the hoses 6 are disconnected from the conduits 44 and the containers are slid from the racks upon which they rest onto a conveyor such as a cart. The covers are removed from the containers and the bean sprouts are dumped into a washing trough.

I claim:
1. A method of growing germinated bean sprouts comprising the steps of:
   a. placing a quantity of germinated beans to a uniform depth in a container having substantially vertical side walls, an open top, a drain opening in the bottom wall and the bottom wall having a gently sloping floor in the direction of the drain;
   b. placing over said beans a substantially opaque relatively rigid cover having a plurality of openings adapted for admitting water and air therethrough and slideably mounted in said container to rise with the growth of said sprouts;
   c. periodically introducing a pre-selected amount of water onto said cover for distribution thereby onto said beans;
   d. draining the water immediately from said beans through said drain opening; and
   e. periodically flowing air through said growing bean sprouts at a selected pressure which will not disturb the orientation of said sprouts, in a direction opposite to the flow of water through said container, and after each introduction of water for a pre-selected duration until there is a substantial change of air within the container.

2. A method of growing bean sprouts as described in claim 1 comprising:
   a. said pressured air has a pressure of less than 1 centimeter of water.

3. A method of growing bean sprouts as described in claim 1 including:
   a. injecting ozone into the air used to subject said beans to said low air pressure flow.

4. A method of growing bean sprouts as described in claim 1 wherein:
   a. said container is approximately 60 centimeters in height; and
   b. the bottom of said container is covered with beans to a depth of about 2 to 5 centimeters.

5. A method of growing bean sprouts as described in claim 1 wherein:
   a. the temperature of water introduced to said beans varies from about 15° C. to 30° C.

6. A method as described in claim 1 wherein:

a. the cycle of watering, draining, and back pressuring is repeated at regular intervals approximately 4 to 10 times each 24-hour period.

7. A method as described in claim 1 comprising:
   a. applying a vacuum through the drain opening in said container of about 40 to 80 centimeters of water pressure for a duration of about 5 to 10 seconds after each watering step to drain excess water from said beans.

8. A method as described in claim 1 wherein:
   a. said back pressure has a duration of about 1 to 5 minutes and the pressure is at least sufficient to push upwardly through all of the bean sprouts in said container and is less than 10 centimeters of water pressure.

9. An apparatus for growing bean sprouts comprising:
   a. at least one container having substantially vertical side walls, an open top, a drain opening in a bottom wall which gently slopes toward said drain opening:
   b. a container top substantially opaque and being formed with a plurality of openings for admitting water and air therethrough, said top being generally coextensive with the area of said container and mounted for vertical sliding movement therein;
   c. means for introducing water to the top of said container; and
   d. means for creating pressure attached to said drain for forcing air upwarldy through the beans and bean sprouts in said container.

10. An apparatus as described in claim 9 comprising:
    a. ozone producing means for introducing ozone to said container through said drain opening when said pressure means is operating.

11. An apparatus as described in claim 9 comprising:
    a. a plurality of said containers;
    b. a common drain pipe connected to the drains of said containers;
    c. an open trough receiving the effluent from said drain pipe;
    d. said pressure means being connected to said drain pipe;
    e. said drain pipe having its discharge end submerged a specified depth in said trough for regulating the maximum pressure applied to said containers;
    f. said trough having an overflow means at a selected height above the discharge end of said drain pipe in said trough for regulating the maximum pressure which said pressure means can apply; and
    g. said drain being placed a selected distance above the level of the water in said trough for regulating the maximum vacuum attainable in said containers.

12. A container for growing bean sprouts as described in claim 11 comprising:
    a. said bottom wall having a slope ratio of elevation to horizontal distance of approximately 1 to 20; and
    b. said side wall height to width ratio being approximately 1 to 1.

13. An apparatus as described in claim 9 comprising:
    a. control means connected to said water introducing means, and said pressure means for automatic cycling of water and air through said container.

14. An apparatus as described in claim 9 comprising:
    a. vacuum means attached to said drain pipe for creating a vacuum within said container for drawing off excess water from said sprouts and container.

15. A container for growing bean sprouts comprising:
    a. said container having vertical side walls and an open top;
    b. said container having a bottom sloping gently inwardly to a drain;
    c. said bottom wall having a downwardly offset portion;
    d. a strainer having a plurality of openings dimensioned for receipt in said offset portion;
    e. a conduit connected to said drain opening depending below the bottom wall of said container;
    f. leg members for elevating the bottom of said container and extending beyond the lower elevation of said conduit; and
    g. a rigid cover formed with a plurality of openings for admitting water to said container and permitting the exhausting of air from said container and being coextensive with the area of said container and mounted for vertical sliding movement within said container;
    h. and means to sequentially introduce water and pressurized air into said container.

* * * * *

UNITED STATES PATENT AND TRADEMARK OFFICE
CERTIFICATE OF CORRECTION

PATENT NO. : 3,945,148
DATED : March 23, 1976
INVENTOR(S) : GEORGE CLEM OYAMA

It is certified that error appears in the above—identified patent and that said Letters Patent are hereby corrected as shown below:

Column 1, line 47, change "ration" to ---ratio---

Column 1, line 48, change "requently" to ---frequently---

Signed and Sealed this

Thirtieth Day of November 1976

[SEAL]

Attest:

RUTH C. MASON
*Attesting Officer*

C. MARSHALL DANN
*Commissioner of Patents and Trademarks*